United States Patent [19]

Kumozaki et al.

[11] Patent Number: 4,984,262

[45] Date of Patent: Jan. 8, 1991

[54] DIGITAL SERVICE UNIT

[75] Inventors: Kiyomi Kumozaki, Yokohama; Seiichi Yamano, Yokosuka; Ryoichi Komiya, Yokosuka, all of Japan

[73] Assignee: Nippon Telegraph and Telephone Corporation, Tokyo, Japan

[21] Appl. No.: 487,031

[22] Filed: Mar. 2, 1990

[30] Foreign Application Priority Data

Mar. 3, 1989 [JP]  Japan ................................. 1-51273

[51] Int. Cl.$^5$ .......................... H04G 3/46; H04M 1/24
[52] U.S. Cl. ............................................ 379/5; 379/27; 371/20.5
[58] Field of Search ................... 379/5, 27, 29; 371/20.5; 370/15; 375/10

[56] References Cited

U.S. PATENT DOCUMENTS 4,766,594  8/1988  Ogawa et al. ...................... 379/5 X Primary Examiner—Stafford D. Schreyer
Attorney, Agent, or Firm—Cushman, Darby & Cushman

[57] ABSTRACT

Network termination equipment including structure for transmitting signals back for loopback test. This can test all the functions of the unit by executing the loopback test only after having verified the normal operation of the circuits related to a call origination.

10 Claims, 19 Drawing Sheets prior art/this invention
activation procedure prior art
loopback test prior art/this invention prior art/This invention loopback test loopback test loopback test

DIGITAL SERVICE UNIT

FIELD OF THE INVENTION

This invention relates to an integrated services digital network (ISDN), and more particularly to a network termination equipment (NT1), which terminates a subscriber line to provide an ISDN basic user-network interface for terminal equipment. Further in particular, this invention relates to a loopback test for NT1.

BACKGROUND OF THE INVENTION

FIG. 1 is a block diagram which shows a conventional NT1 (network termination equipment).

The equipment comprises a transmitter circuit 11 and a receiver circuit 12 on a terminal equipment side, a receiver circuit 13 and a transmitter circuit 14 on a subscriber line side, a circuit termination 15, a call origination signal detector 16, a call origination signal transmitter 17, a power feeder 18 and a power unit 19.

FIG. 2 is a sequence chart to show operations when the equipment is activated.

When an activation request for NT1 is made at a terminal equipment (TE), the equipment transmits a call origination signal to the NT1. The call origination signal detector 16 in the NT1 detects the signal and feeds a detection output to the call origination signal transmitter 17. The transmitter 17 transmits a call origination signal to the line termination equipment at the telephone office via a subscriber line. The call origination may be notified by closing the loop on a subscriber line or by transmitting a tone signal.

The line termination equipment at the telephone office originates an activation request for a subscriber line when it receives a call origination signal, and transmits training pulses to the NT1. The receiver 13 receives the training pulses and conducts adaptive line equalization when it receives them. When equalization ends and when frame synchronization is established by the circuit 15, the transmitter 14 transmits training pulses to the equipment at the telephone office. When adaptive line equalization is completed at the office equipment and the frame synchronization is established, the activation of subscriber line is completed to start communication.

FIG. 2 shows the case of activation by an incoming call of a caller. FIG. 3 shows the activation sequence at the time of a loopback test.

The line termination equipment at the telephone office transmits training pulses to the NT1 upon request of activation for a subscriber line, and the NT1 in turn transmits training pulses to the equipment at the office after having established frame synchronization.

The equipment at the office transmits a control signal for loopback test to the NT1 by using control bits within the frame structure, on the subscriber line after having established the frame synchronization.

When the circuit termination 15 detects a control signal indicative of loopback test, it transmits an SW1 driving signal to switch SW1 for the loopback to close the loop by turning on the switch SW1. Then, the circuit 15 sends to the equipment at the office an indication signal of loopback test by using control bits within the frame structure on the subscriber line.

The equipment at the office recognizes completion of loop closure for loopback at the NT1 when it receives the indication signal, and measures a bit error rate on the loopback path.

As stated above, the conventional NT1 closes a loop under control of the equipment at the central office, to test the loopback path. Such a test verifies the operations of the transmitting/receiving lines, both at the subscriber line side and at the terminal equipment side of the NT1. It also tests the circuit terminations, and the power unit which supplies power to the above circuits.

These operations are controlled by the circuit termination 15. In order to facilitate the understanding, description will now be given of the operation of the circuit 15.

The circuit termination 15 has four modes of operation, an initial mode, an activation mode, a communication mode, and a loopback test mode. FIG. 4 shows the relation among these modes, and FIGS. 5 through 7 show respectively the operation flows of the above four modes.

In the initial mode (FIG. 5), the circuit termination 15 does not send out signals to the circuits 11 and 14, but rather waits for training pulses from the line termination equipment at the telephone office. When the training pulses arrive from the equipment at the office, in the initiation sequence as shown in FIG. 2, the operation of the circuit 15 is shifted from the initial mode to the activation mode (FIG. 5), and then to the communication mode (FIG. 7).

In the communication mode, the circuit 15 executes a call between the terminal equipment and the line termination equipment at the telephone office. When the call is completed, the mode of the circuit 15 is shifted from the communication mode back to the initial mode. Step 600 detects a control signal indicative of loopback test having arrived from receiver 13 during the communication mode, and then step 602 shifts the circuit 15 to the loopback test mode. When the test ends, circuit 15 is returned to the communication mode at step 604.

The loopback test of the NT1 is intended for testing all the functions and performance of the NT1. The conventional system is defective, however, in that it cannot test the call origination signal detector or the call origination transmitter which operates when activated by a call from the terminal equipment as the subscriber line is activated by the equipment at the telephone office at the loopback test. Moreover, it cannot verify the operation of the power feeder which supplies the power to the terminal equipment by such loopback test.

This invention was conceived to overcome such defects encountered in the prior art and aims at providing a NT1 which can test a circuit which operates when the unit is activated by an incoming call from the terminal equipment and/or the power feeder which supplies power to the terminal equipment.

SUMMARY OF THE INVENTION

The NT1 according to this invention has a means which originates a pseudo-call origination signal to a call origination signal detector and a call origination transmitter, and has a loopback means includes a means which executes a loopback test only on the condition that the pseudo-call origination signal has been normally transmitted.

It is preferable that the DSU further includes a means which can verify the normal operation of the power feeder.

At the loopback test, the operations of the call activation and the power feeder are first tested, and if they are normal, the loopback test is then conducted. Therefore, all the functions of a NT1, including those for operation of activation by an incoming call, and the feeding of power can be tested by a loopback test.

BRIEF DESCRIPTION OF THE DRAWINGS

These and other aspects of the invention will now be described in detail with reference to the accompanying drawings, wherein.

DESCRIPTION OF THE PREFERRED EMBODIMENT

Figure 8:
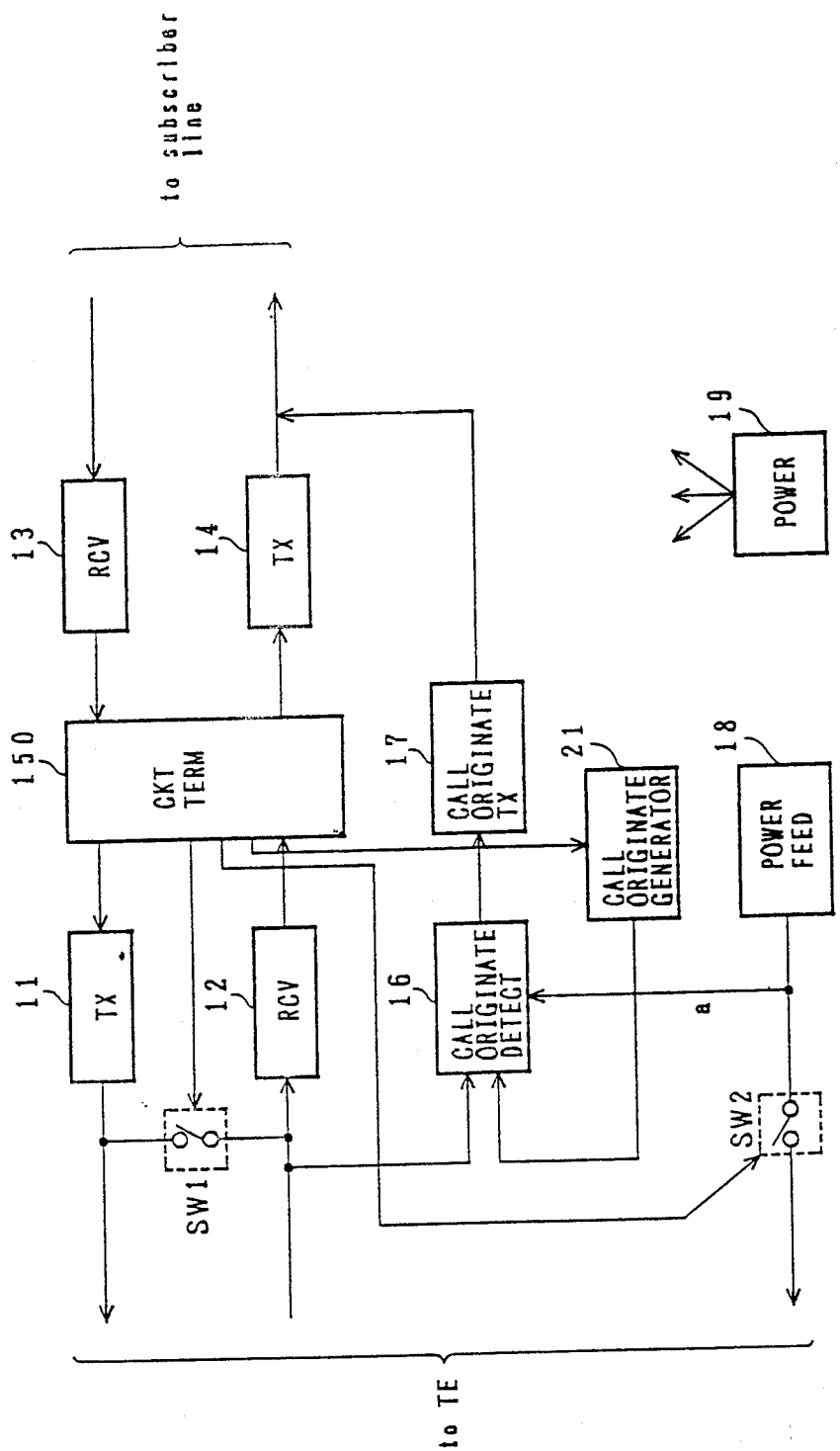
FIG. 8 is a block diagram to show the first embodiment of the NT1 of this invention.

FIG. 8 shows a block diagram of the first embodiment of an NT1 according to this invention.

The embodiment includes a call origination detector 16 which detects a call origination transmitter 17 which transmits the information on the call origination detected by the detector 16 to the line termination equipment at the telephone office of an ISDN, and a power feeder 18 which supplies power to the terminal equipment at the customer premises A circuit termination 150 is also provided. A switch SW1 forms a means for sending back a transmitted signal, to respond a loopback control signal from the office. The embodiment includes a transmitter 11 which transmits signals to the terminal equipment, a receiver 12 which receives signals from the terminal equipment, a receiver 13 which receives signals from the subscriber lines, and a transmitter 14 which transmits signals to the subscriber line. It also includes a power unit 19 which feeds power to the respective circuits.

This NT1 also has a call origination signal generator 21 as a means which generates pseudo-call origination signals to the detector 16 and the transmitter 17. This causes the output from the power feeder 18 to be connected to the call origination detector 16 in order to verify that the power unit 18, is operating normally. Means is also provided for executing a loopback test only on the condition that the pseudo-call origination signal has been duly transmitted.

In operation, generator 21 outputs a call origination signal to the detector 16. The detector 16 is then supplied with the output from the power feeder 18.

Figure 1:
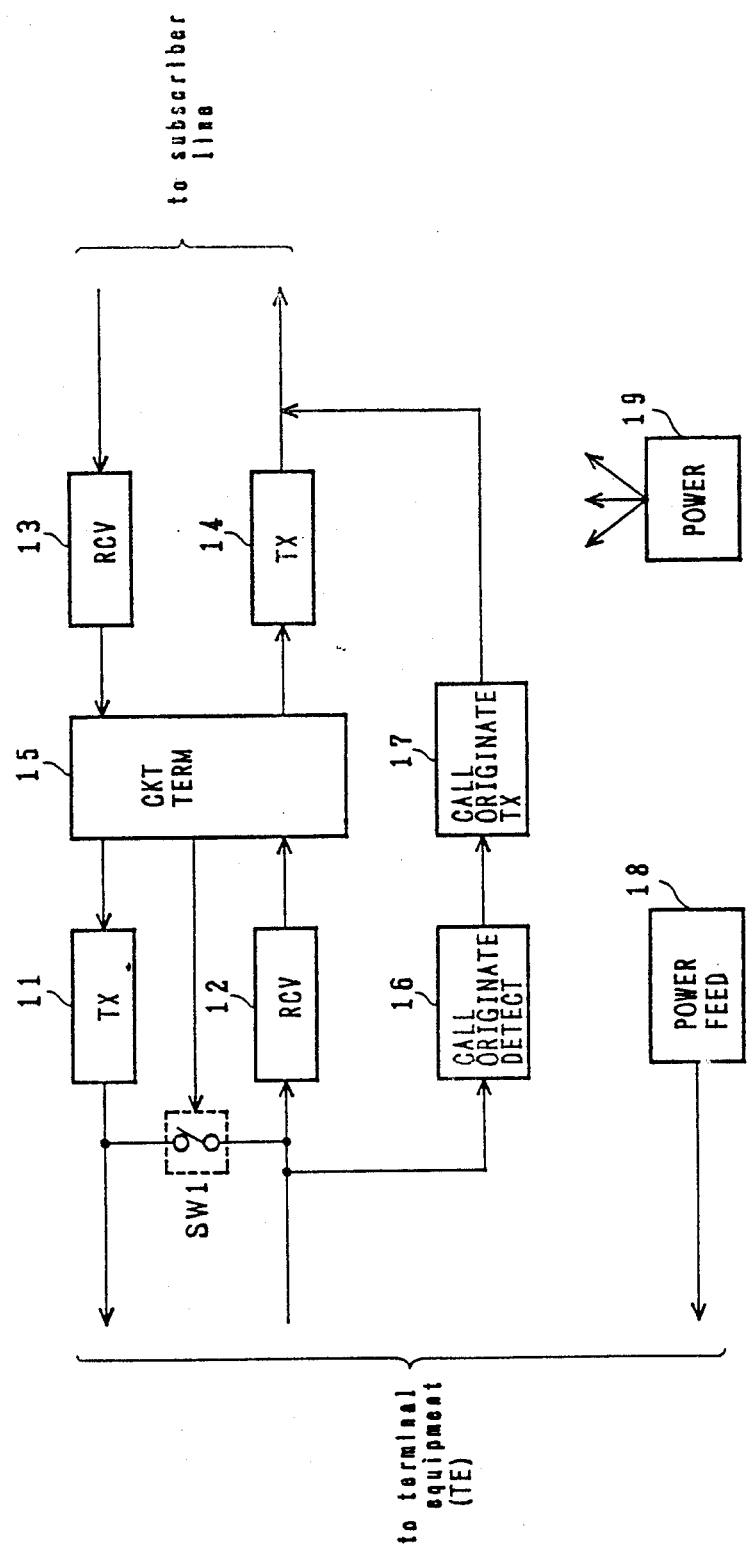
FIG. 1 is a block diagram of a conventional NT1.
Figure 2:
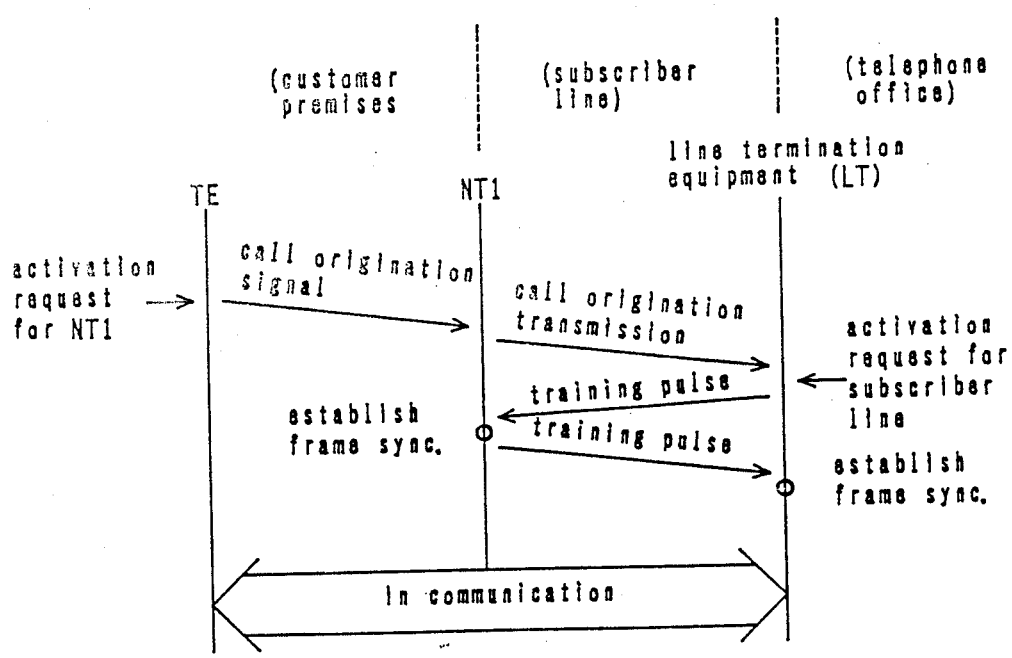
FIG. 2 is a sequence chart at the time of activation which can be used commonly both by the conventional equipment and this invention.
Figure 3:
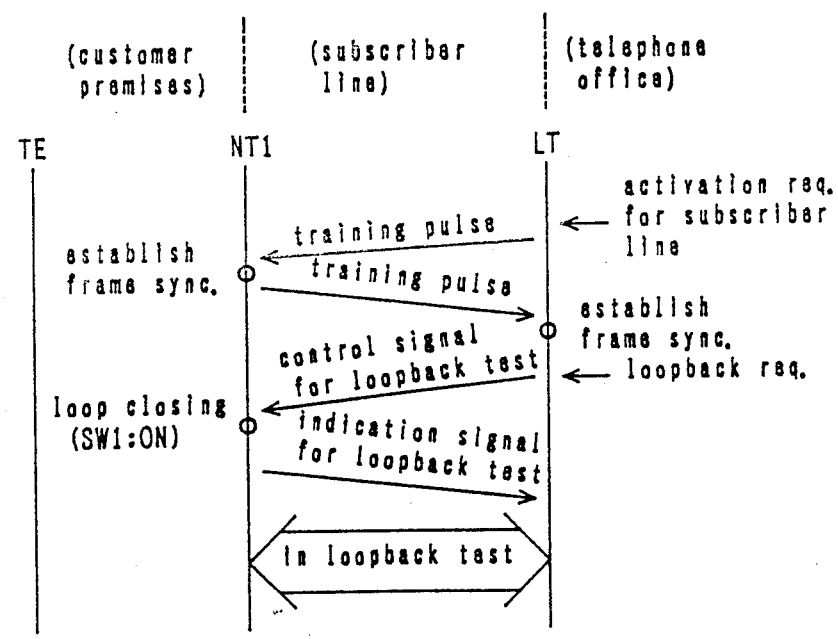
FIG. 3 shows an activation sequence of a loopback test in a prior art equipment.
Figure 4:
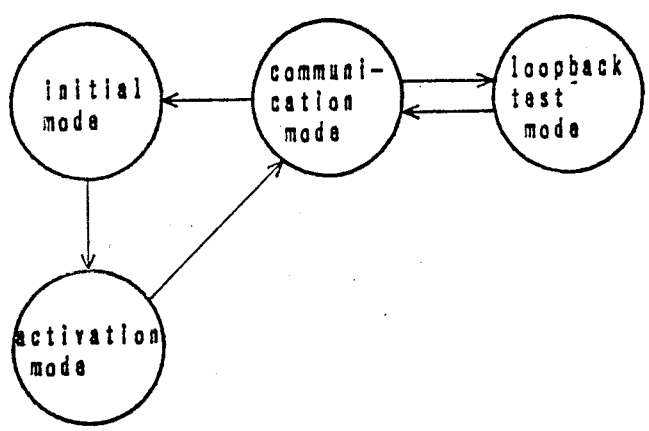
FIG. 4 is a chart to show the flow among modes of a prior art circuit termination.
Figure 9:
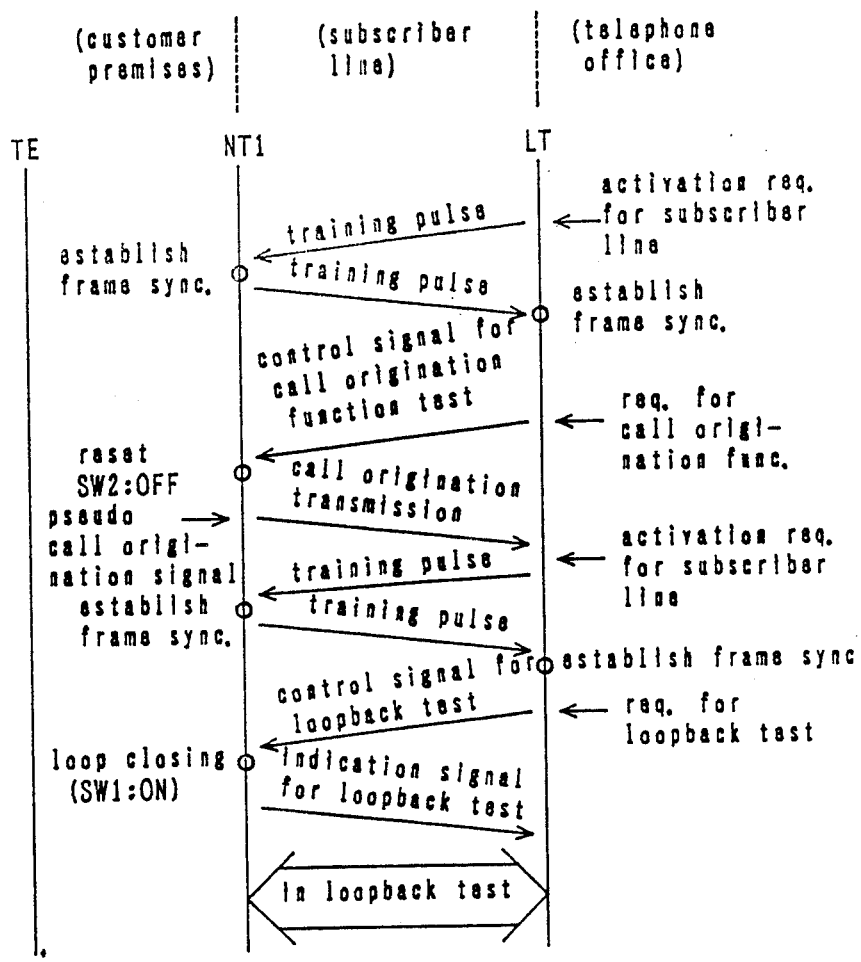
FIG. 9 shows an activation sequence for the loopback test of the first embodiment.

The operation at the time of activation of the NT1 is identical to that described in relation to FIG. 2. However, FIG. 9 shows an activation sequence for the loopback test, which is superior to the prior art technique.

The equipment at the telephone office sends out training pulses to the NT1 upon detecting a request for subscriber line activation. The NT1 transmits the training pulses to the equipment at the office after having established a frame synchronization.

The equipment at the office transmits a call origination unction test control signal to the NT1 by using control bits within the frame of the subscriber line, after having established frame synchronization. The circuit termination 150 resets all circuits of the NT1 to an initialized state when it detects a call origination function test control signal and then suspends all operations. Simultaneously, the circuit 150 opens the switch SW2 by outputting an SW2 driving signal so as to remove the connection to the terminal equipment and thereby prevent the power feeder 18 from being affected by any failure within the terminal equipment.

Subsequently, the generator 21 outputs a pseudo call origination signal which is coupled to the detector 16. When the detector 16 receives the signal, it executes the activation sequence shown in FIG. 2. In other words, the detector 16 transmits the detection output to the transmitter 17, and the transmitter 17 transmits a call origination signal to the equipment at the office via a subscriber line. This transmission is not an authentic call origination signal, because it is not responsive to a real call signal. This signal is referred to as a pseudo signal. It may be executed by closing a loop on the subscriber line or sending out a tone signal.

When the equipment at the telephone office receives the transmitted call origination signal, it sends out training pulses to the NT1 upon request for activation of the subscriber line. The receiver 13 conducts an adaptive line equalization when it receives the training pulses. Upon completion of the adaptive line equalization and establishment of a frame synchronization, the transmitter 14 transmits training pulses to the equipment at the office.

The subscriber line is fully activated by the completion of adaptive line equalization and frame synchronization establishment at the equipment at the office. Then, the equipment transmits a loopback control signal to the NT1 by using control bits within the downstream subscriber line frame.

The circuit termination 150 of the NT1 detects the control signal, and transmits an SW1 driving signal to SW1, thereby closing a loop for loopback across the contacts of SW1.

When the loop is formed, the circuit 150 transmits the indication signal for loopback to the equipment at the office by using control bits out of the subscriber line frame. By receiving the indication signal, the equipment at the office recognizes the completion of loop formation, and measures a bit error rate by using the loopback path.

In the sequence described above, when either the detector 16 or the transmitter 17 fails, the NT1 cannot notify the equipment at the office of a call origination when it has received a call origination test control signal from the equipment. Therefore, this failure at the NT1 can be detected by the equipment at the office when the call origination is not received.

When the power feeder 18 fails, it causes a corresponding failure of detector 16, since it is supplied with power from the output a of the circuit 18. Therefore, when the NT1 receives a call origination control signal from the equipment at the office, the NT1 remains suspended. As a result, this abnormality of the NT1 can also be detected. A similar effect may be achieved by constructing the unit in a manner that the transmitter 17 is operated by the output of the power feeder 18.

Figure 10:
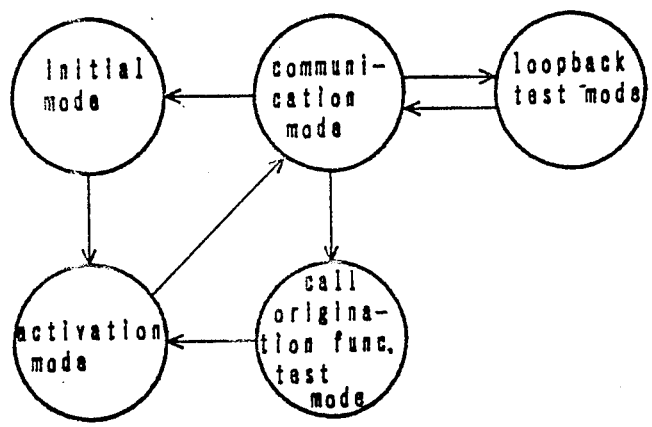
FIG. 10 is a chart to show the flow among modes of a circuit termination which is used to realize this invention.

The operation of the circuit termination 150 will now be described. The circuit termination 150 has all modes of operation of circuit termination 15, and also has a fifth operation mode for a call origination function test mode in addition to these four modes. FIG. 10 shows the relation among those modes.

Figure 5:
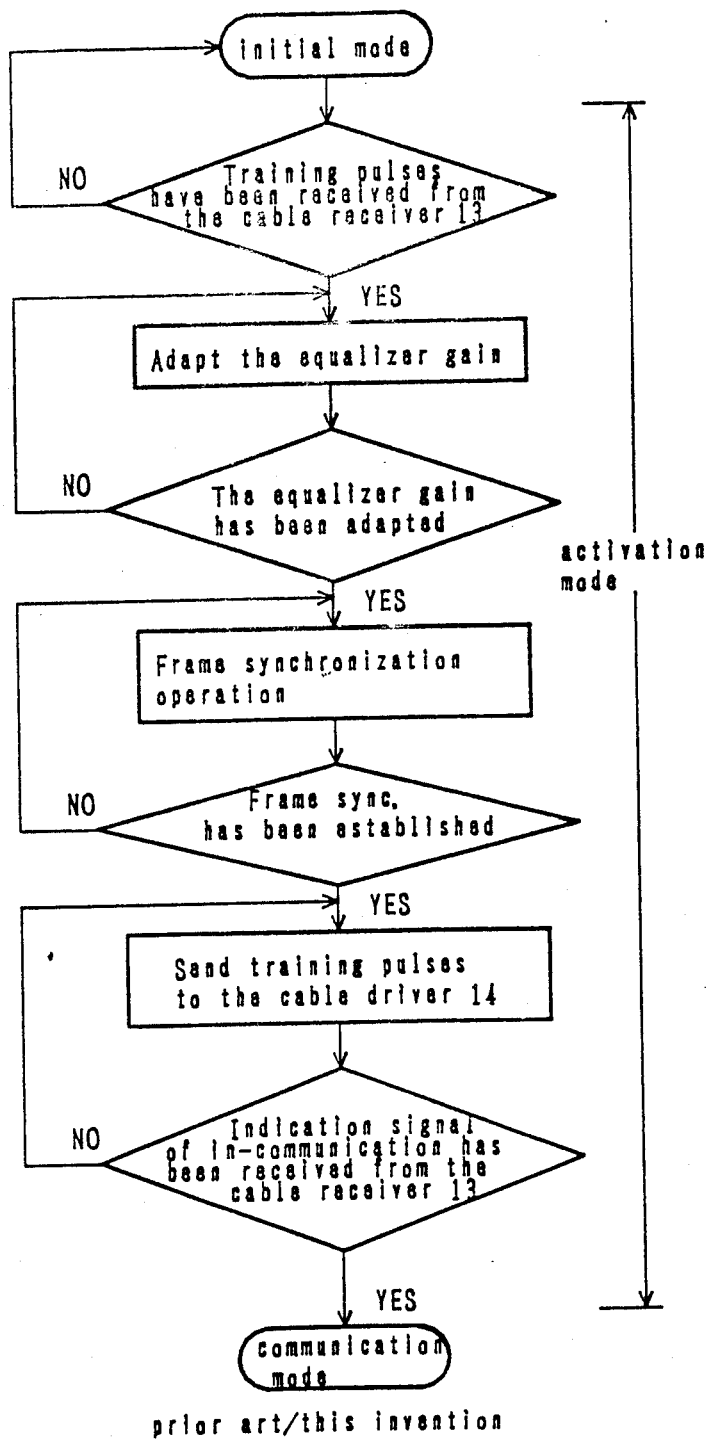
FIG. 5 is a flow chart of a circuit termination in an activation mode which can be used commonly for both the prior art equipment and this invention equipment.
Figure 6:
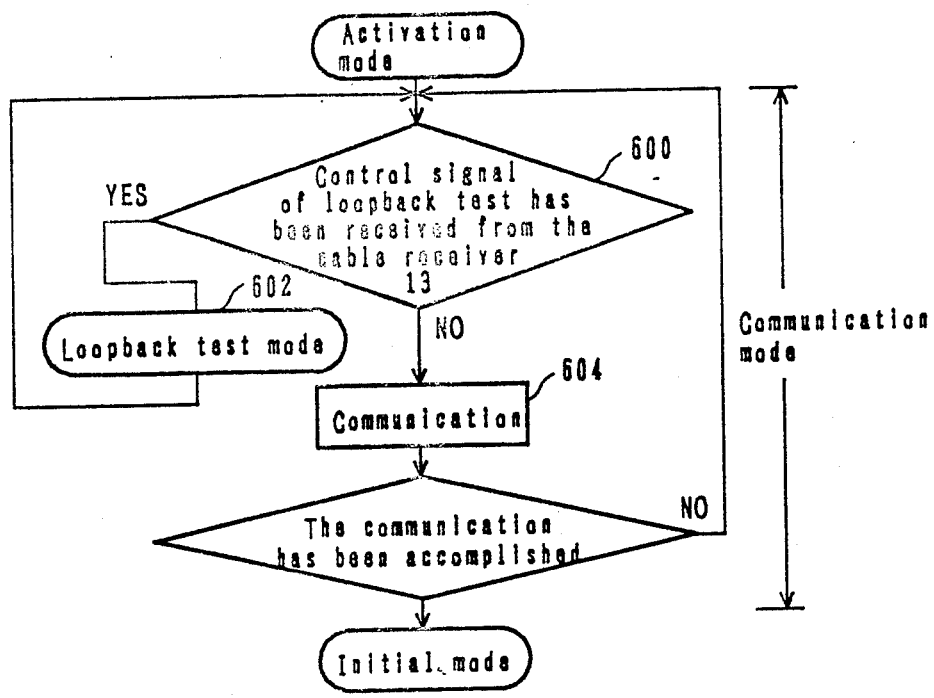
FIG. 6 is a flow chart of a conventional circuit termination in the communication mode.
Figure 7:
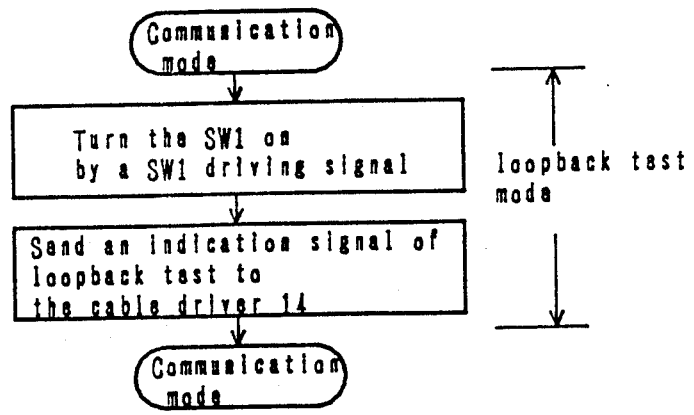
FIG. 7 is a flow chart of a circuit termination in the loopback test mode which can be used commonly both by the prior art equipment and this invention equipment.
Figure 11:
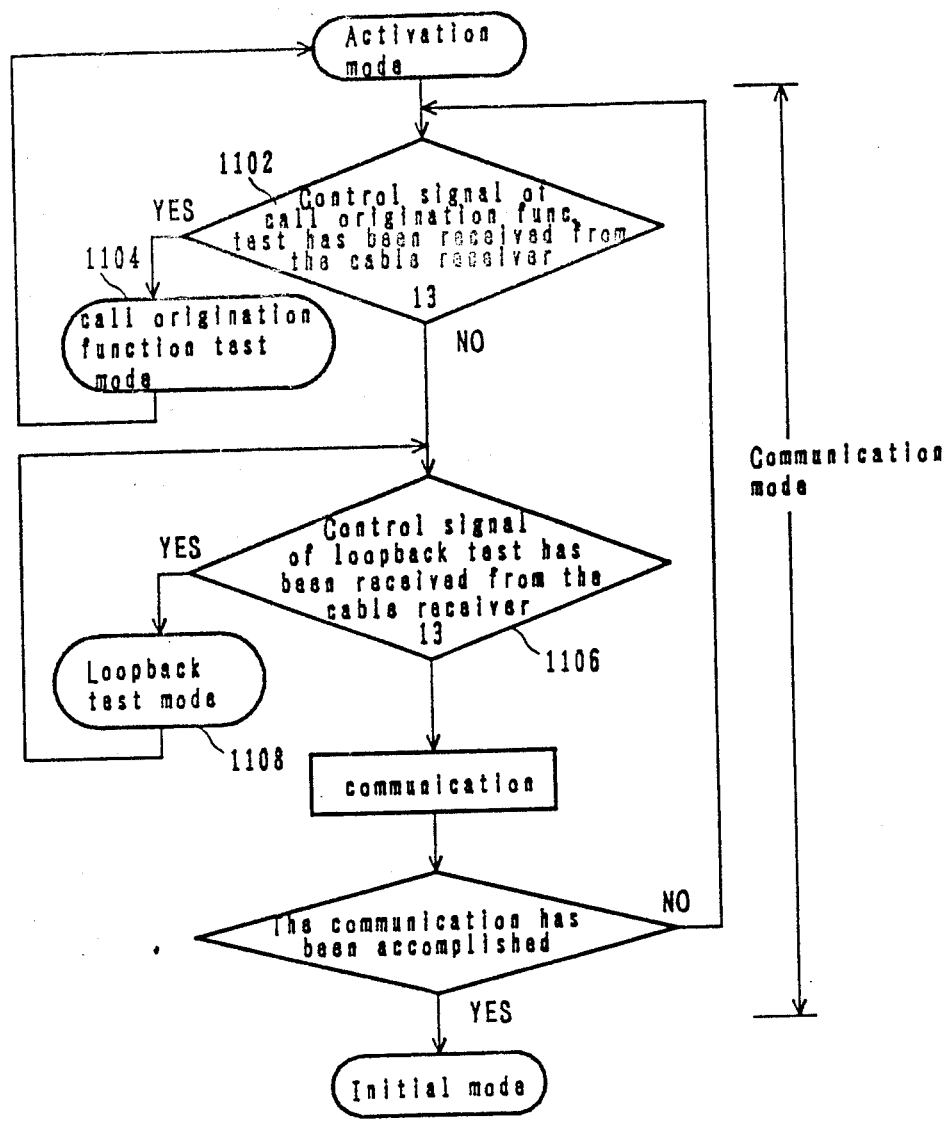
FIG. 11 is a flow chart in the communication mode of the circuit termination.
Figure 12:
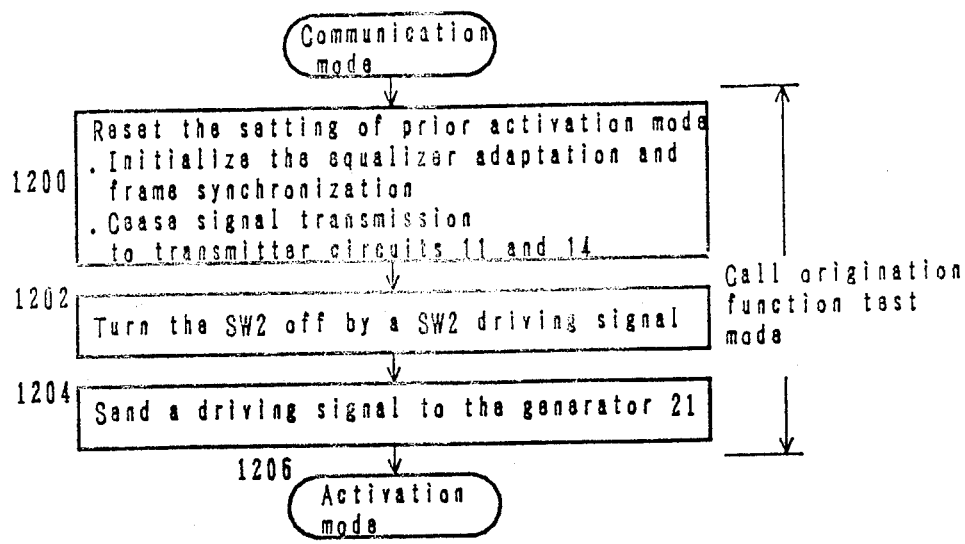
FIG. 12 is a flow chart of a circuit termination in the call origination function test mode of the first embodiment.

FIG. 11 shows the operation flow in the communication mode. FIG. 12 shows the operation flow in the call origination function test mode. The other three modes, the initial, activation and loopback test, are identical to those in the prior art, and the two modes of activation and loopback test are respectively shown in FIGS. 5 and 7.

The call origination function test mode is the operation mode to which the circuit is shifted from the communication mode when it receives a call origination function test control signal from the receiver 13. The mode is reset to the prior activation mode, and frame synchronization is made at step 1200. Switch SW2 is turned off at step 1202, and a driving signal is transmitted to the generator 21 at step 1204. When the call origination function test mode ends, the circuit 150 enters the activation mode at step 1206.

In the operation flow shown in FIG. 9, an example is shown to first transmit a pseudo-call origination signal to the equipment at the telephone office and then to execute the loopback test, which constitutes an essential part of this invention. FIG. 11 shows receiving a call origination function test control signal at step 1102 and executing a call origination function test mode in response thereto at step 1104 similarly, the loopback test mode is executed at step 1108 when it receives the loopback control signal at step 1106. Therefore, the tests can be continuously conducted, since an NT1 loopback test may be conducted at the second test and thereafter without generating a pseudo-call origination transmission each time.

Figure 13:
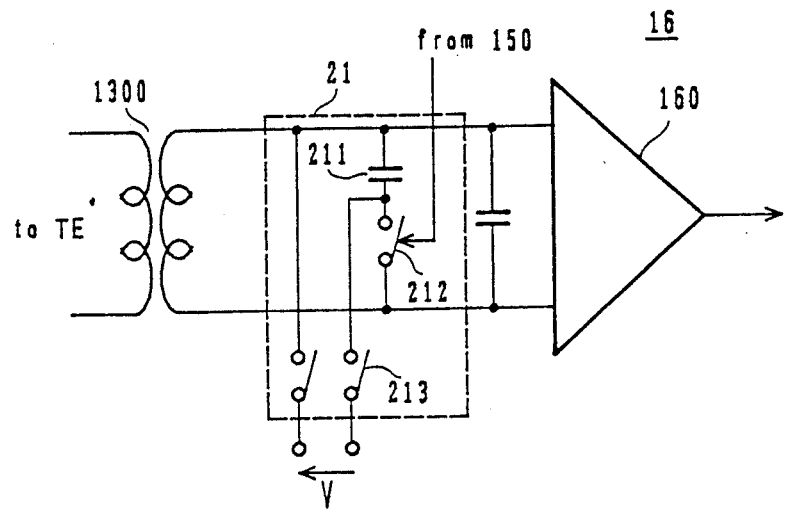
FIG. 13 shows an embodiment of a generator of a call origination signal together with a call origination signal detector.

FIG. 13 shows an embodiment of a call origination signal generator together with a call origination signal detector.

The detector 16 is connected to the terminal equipment via a transformer 1300 and receives a call origination signal as input in pulses from the terminal equipment. The detector 160 is a circuit which is used to detect pulse power. When voltage pulses are provided externally to an input from outside, it recognizes them as a call origination signal. In the embodiment shown in FIG. 13, a voltage V (e.g. V=5 volts) is applied at a capacitor 211 by closing a switch 213 within a predetermined period and the capacitor 211 is connected to an input of the detector 160 by turning on the switch 212 using a driving signal from the circuit termination 150. Changes in voltage caused by discharging of the capacitor 211 are detected as a call origination signal by the detector 160. If the voltage V is supplied from the feeder 18, the operation of the circuit may be checked simultaneously.

Figure 14:
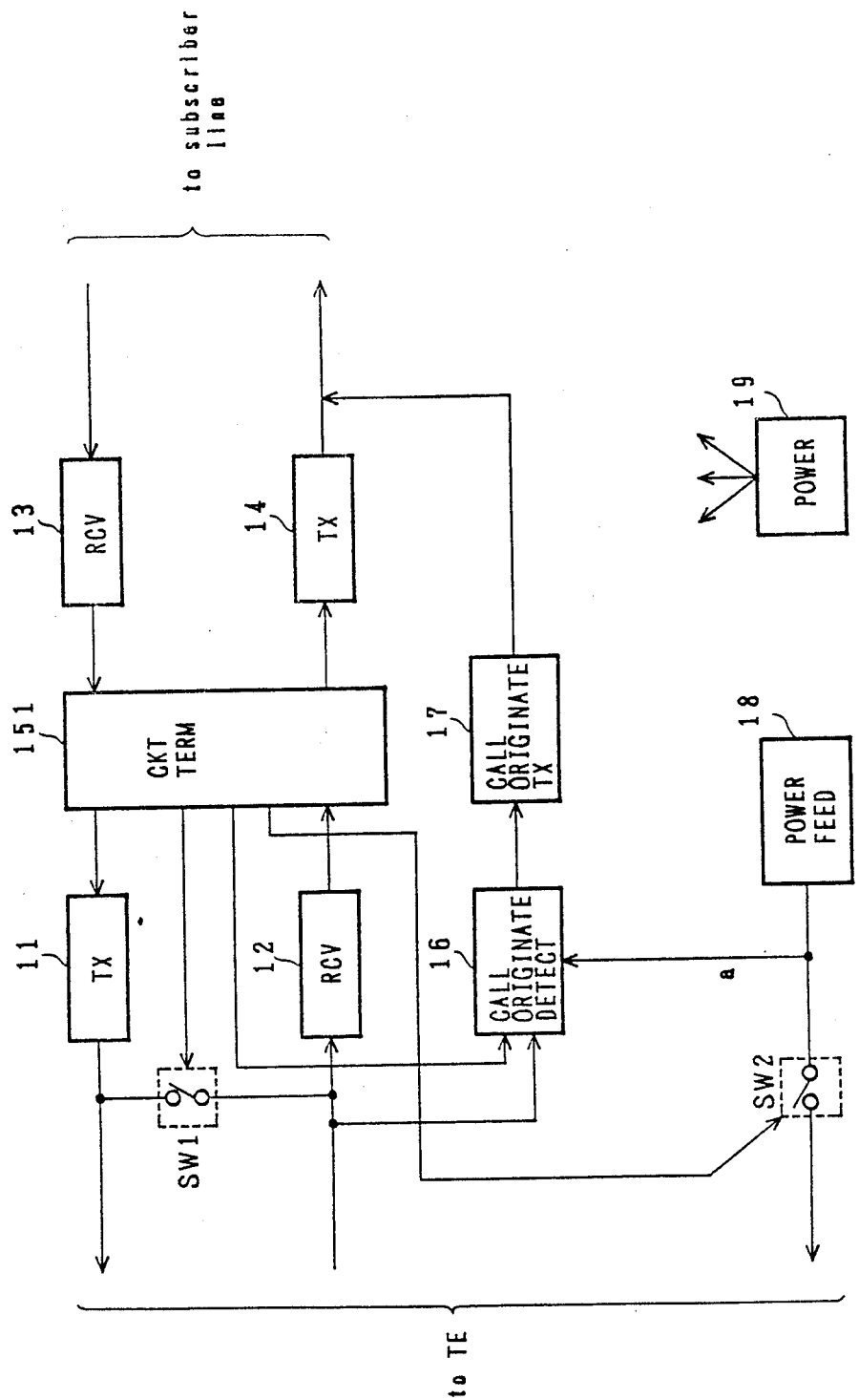
FIG. 14 is a block diagram to show the second embodiment of an NT1 according to this invention.

FIG. 14 is a block diagram to show the second embodiment of the NT1 of this invention.

The second embodiment differs from the first one in that it outputs a call origination signal directly from the circuit termination 151 instead of employing the generator 21 used in the first embodiment. The second embodiment is simpler in the structure than the first embodiment.

The circuit termination 151 is generally formed of a plurality of ICs which embody the functions thereof. This allows an addition of extra functions either by additional ICs or otherwise, for outputting a call origination signal. The activation sequence at the loopback test and the operation modes of this embodiment are identical to those in the first embodiment.

Figure 15:
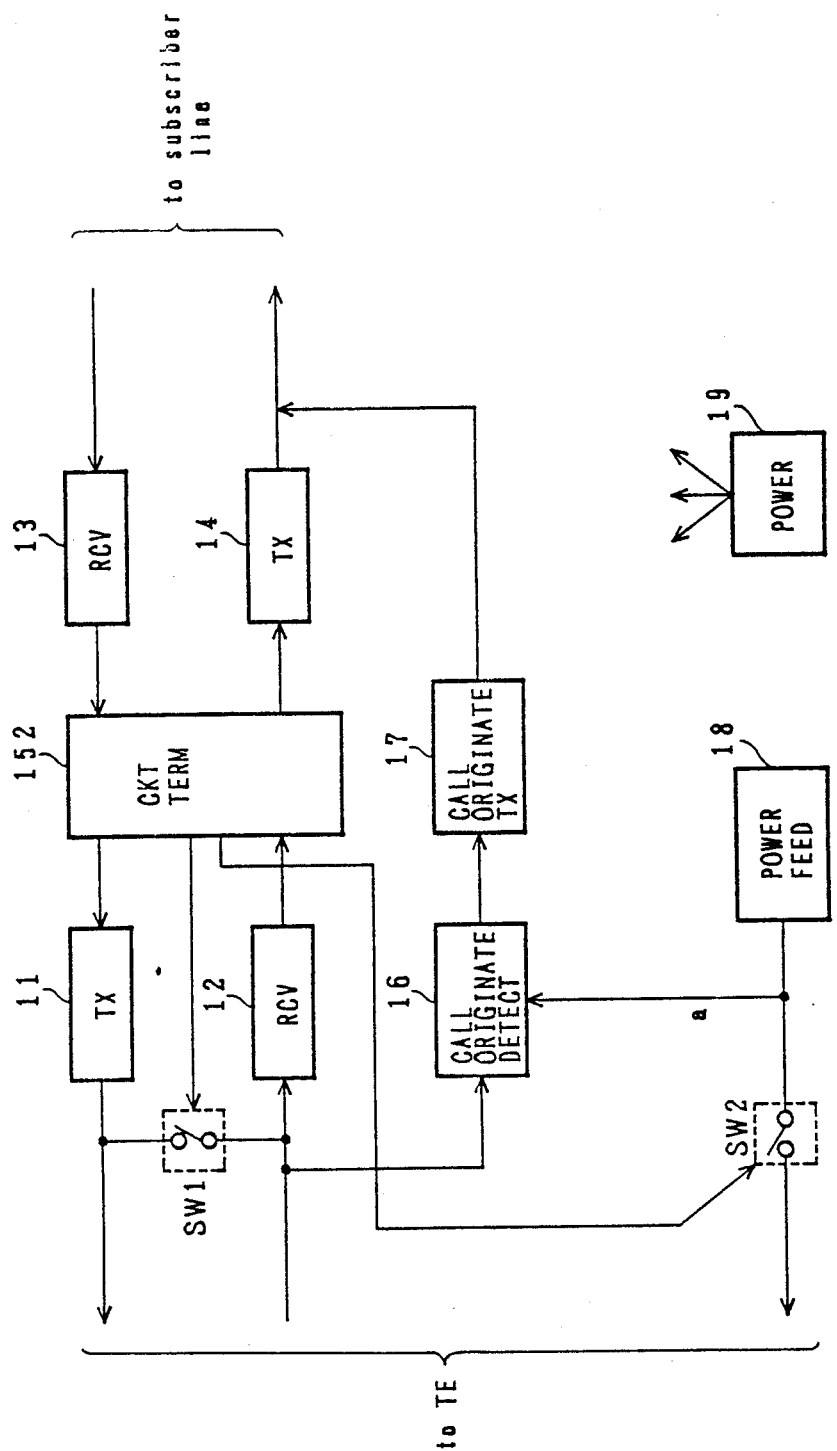
FIG. 15 is a block diagram to show the third embodiment of an NT1 according to this invention.

FIG. 15 is a block diagram to show the third embodiment of the NT1 of this invention.

The circuit structure in the third embodiment is further simplified as it can execute loopback tests without using the call origination signal generator 21 used in the first embodiment.

Figure 16:
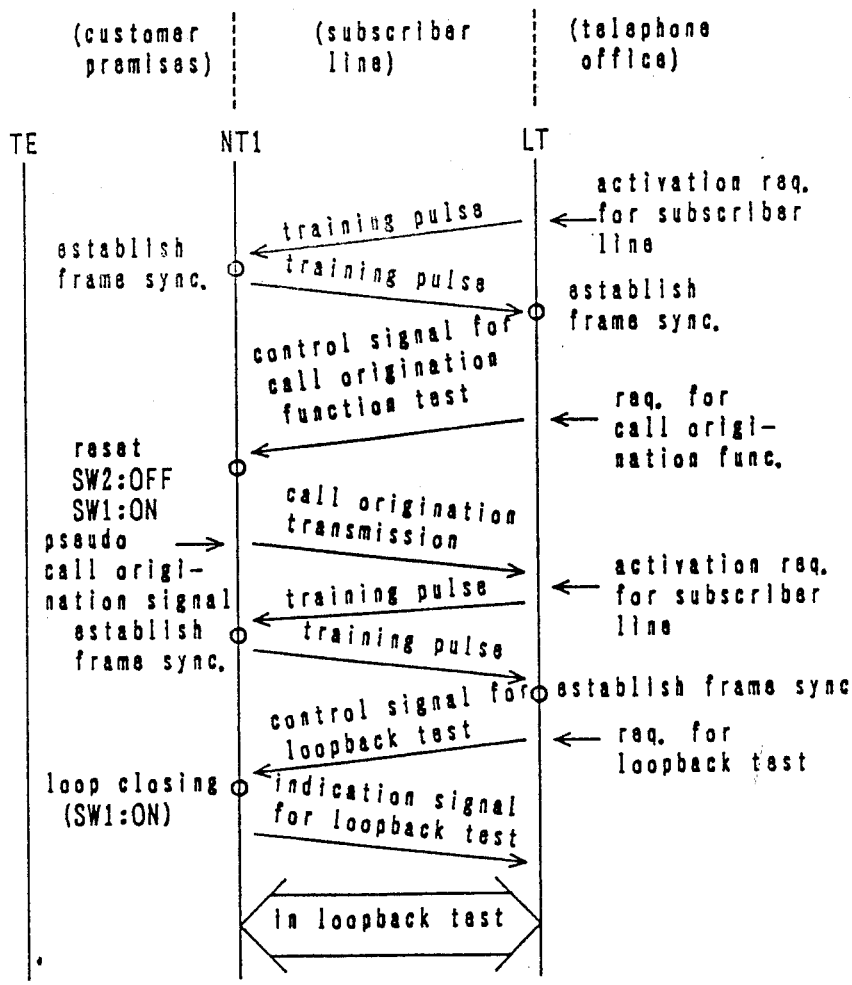
FIG. 16 shows an activation sequence of a loopback test in the third embodiment.

FIG. 16 shows the activation sequence of the loopback test in this embodiment which differs from the first embodiment shown in FIG. 9 in the operation to be taken when it receives a call origination function test control signal from the equipment at the office.

More particularly, this embodiment temporarily resets all the circuits of the NT1 after receiving the call origination function test control signal, turns off the switch SW2 and turns on the switch SW1. Then the circuit termination 15 outputs a call origination signal which is supplied to the call origination signal detector 16 via the transmitter 11 and the switch SW1. The sequence in the subsequent procedure is identical to those in the first embodiment.

Figure 17:
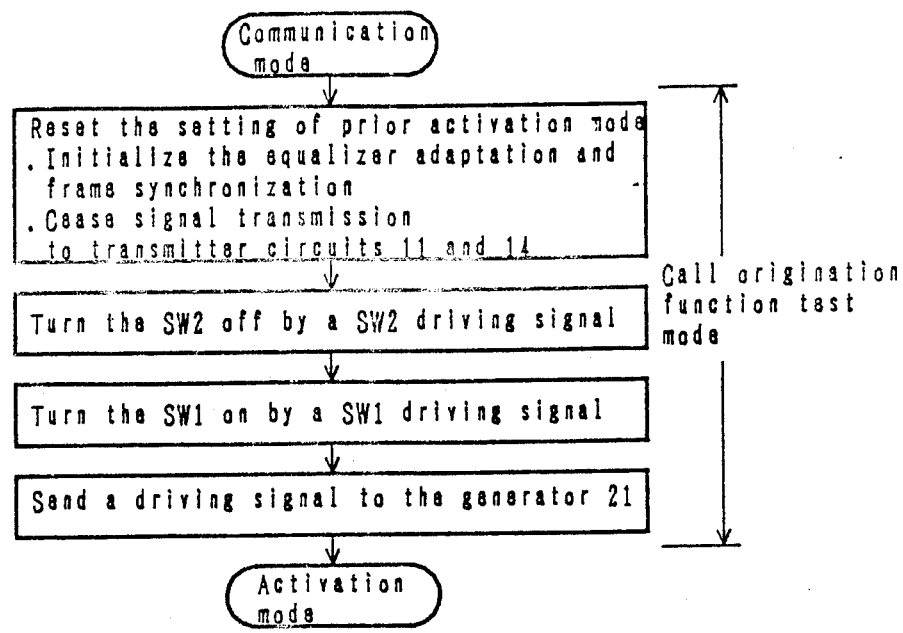
FIG. 17 is a flow chart of a circuit termination in the third embodiment in the call origination function test mode.

FIG. 17 shows the operation flow in the call origination function test mode at the circuit termination 158 to execute the activation sequence. The flow differs from the first embodiment in that it outputs a SW1 driving signal after having outputted a SW2 driving signal. Other flow and the operation modes, other than the call origination function test mode are identical to those in the first embodiment.

Figure 18:
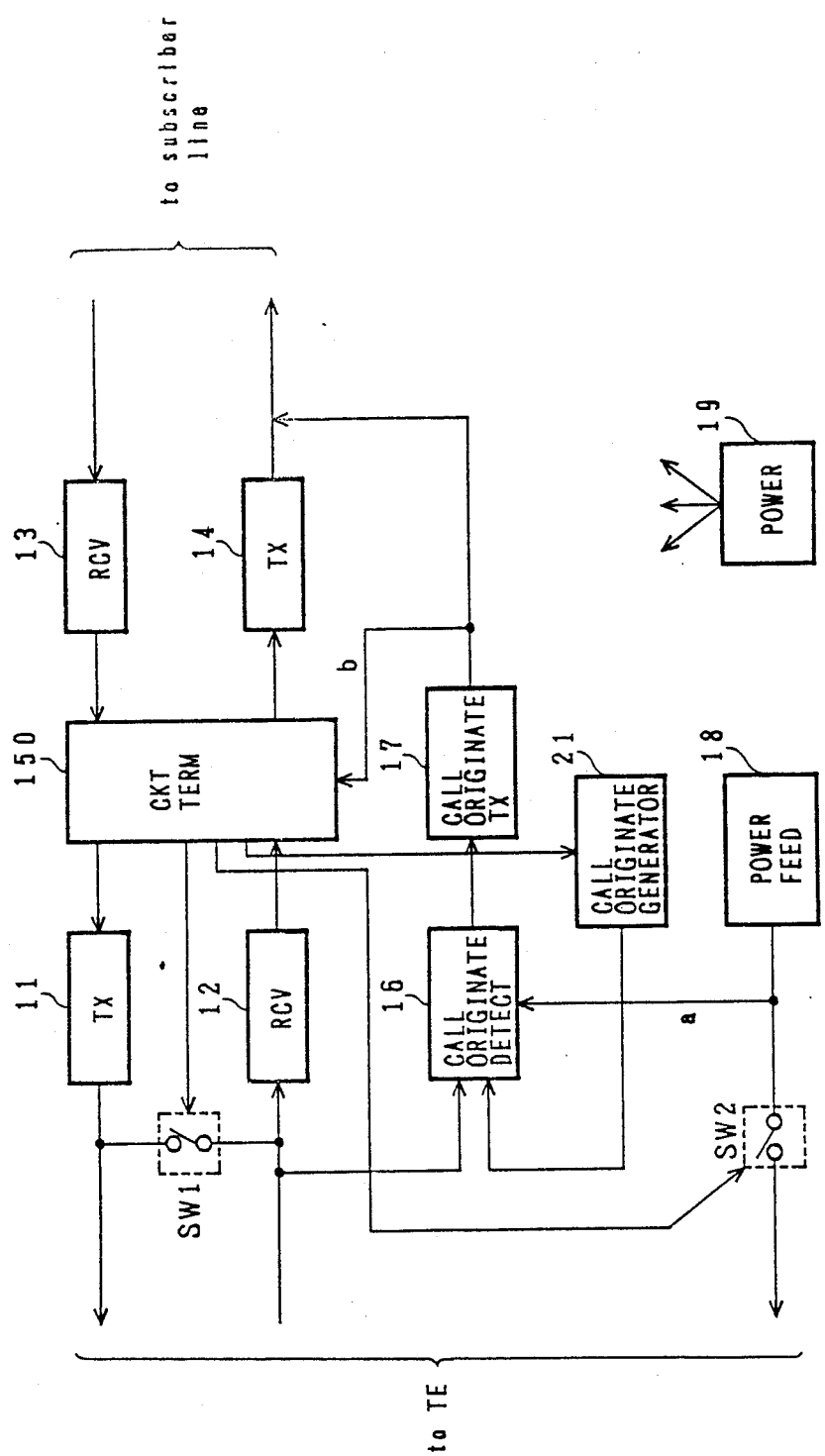
FIG. 18 is a block diagram of the fourth embodiment of a NT1 according to this invention.

FIG. 18 is a block diagram to show the fourth embodiment of the NT1 according to this invention.

This embodiment differs from the first embodiment in that the output b of the call of the call origination transmitter 17 is supplied to the circuit termination 150.

Figure 19:
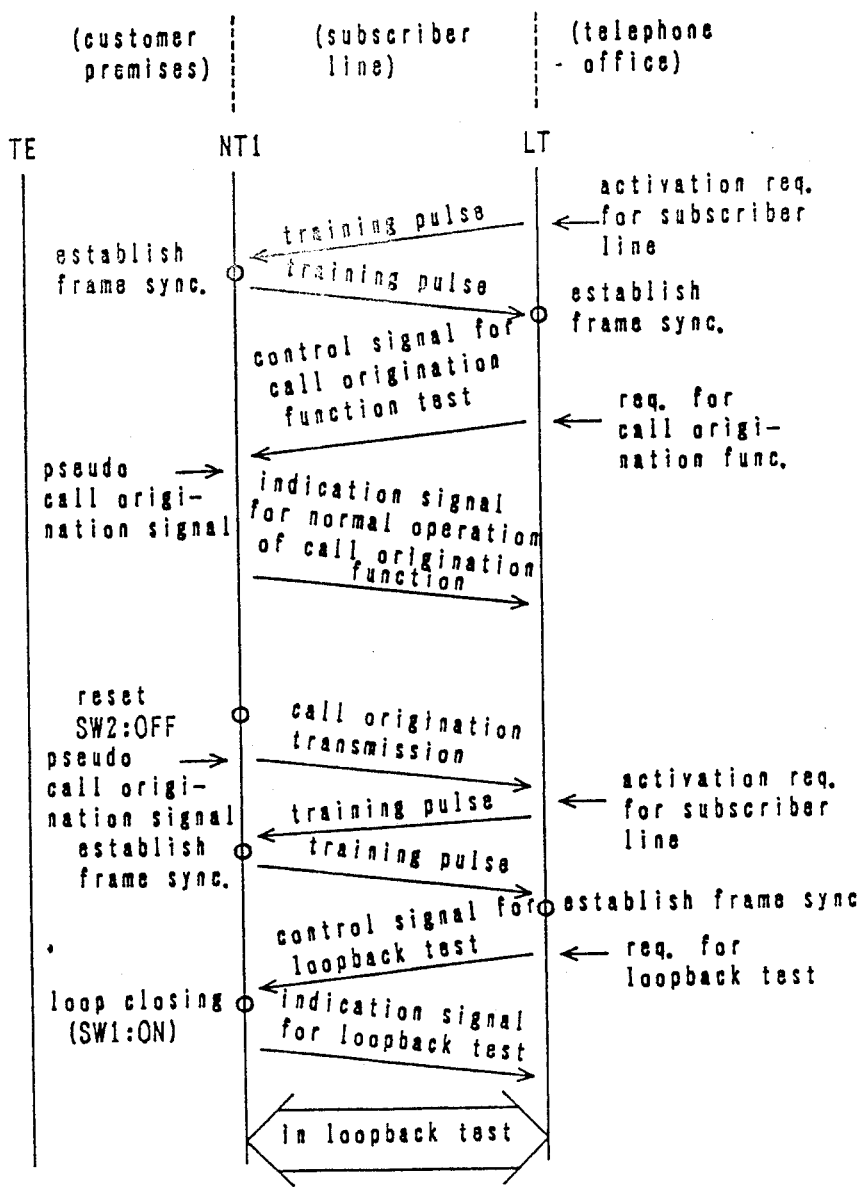
FIG. 19 is an activation sequence of a loopback test in the fourth embodiment.

FIG. 19 shows the activation sequence at the loopback test in this embodiment which differs from the sequence shown in FIG. 9 by the operation to be taken upon receipt of a call origination function test control signal from the equipment at the office.

More specifically, when this embodiment receives a call origination function test control signal, it feeds the call origination signal from the generator 21 to the detector 16, instead of resetting the NT. As a result, the circuit 150 can transmit a signal indicating that the result of the call origination test was good using status indication bits at an allocated position within the upstream subscriber line frame, after a call origination signal is output at the output b of the transmitter 17. This provides the information that all the functions of the detector 16 and of transmitter 17 which operate when activated by an incoming call and of the power feeder 18 which supplies power to the terminal equipment, are normal. Then, all the circuits of the NT1 are reset, the switch SW2 is turned off, and a call origination signal is fed from the generator 21 to the detector 16. The subsequent sequence is identical to the rest of the first embodiment.

Figure 20:
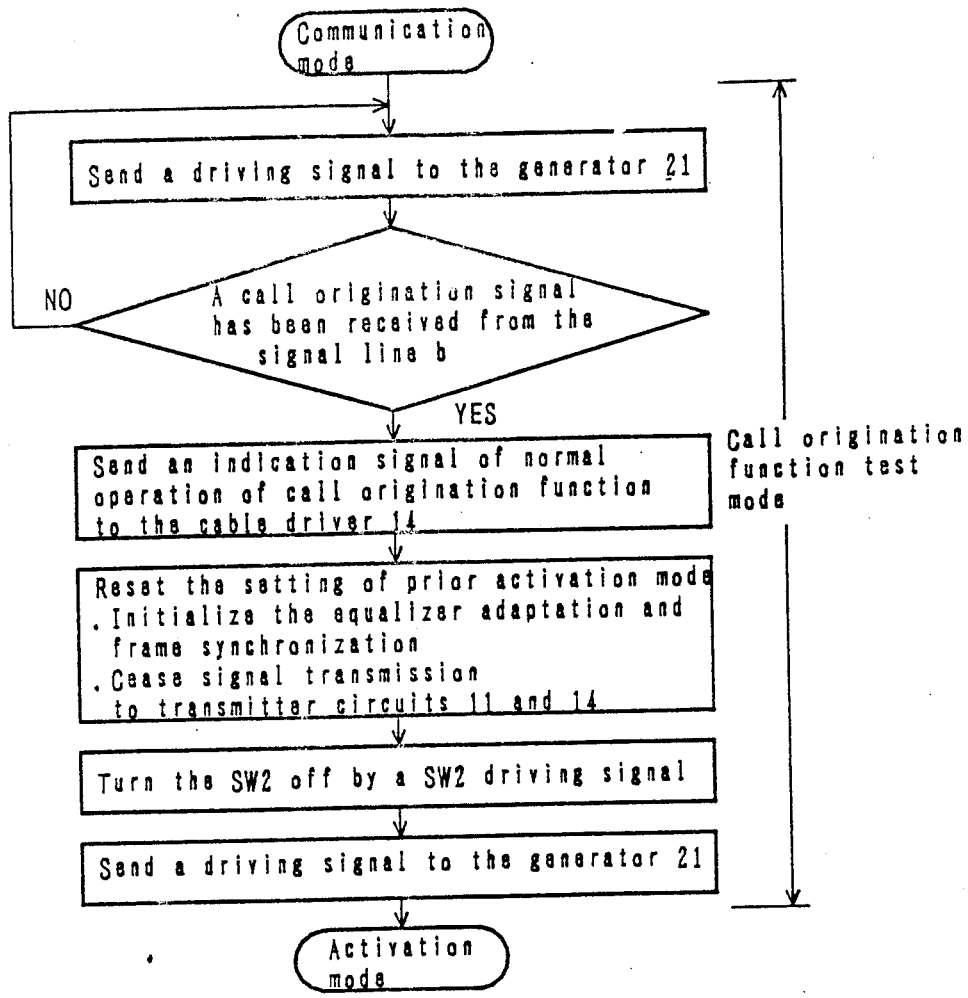
FIG. 20 is a flow chart of the circuit termination in the fourth embodiment in the call origination function test mode.

FIG. 20 shows the operation flow of the circuit termination in the call origination function test mode for executing the sequence. It differs from the first embodiment in that the transmission of a driving signal to the generator 21 and the receipt of a call origination transmissions signal from the line b are verified, but other flow and operation modes than the call origination test mode are identical to those in the first embodiment.

Figure 21:
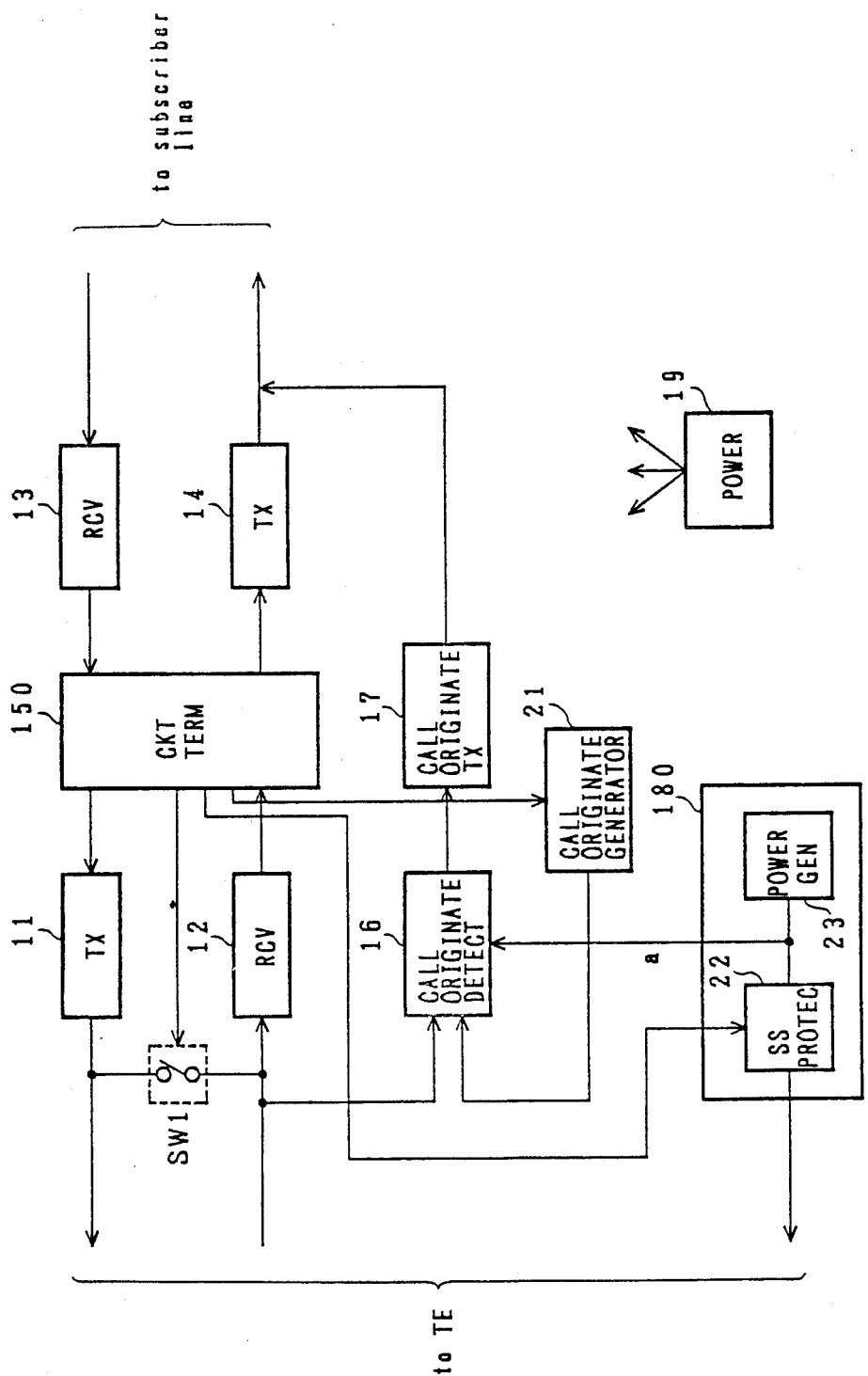
FIG. 21 is a block diagram of the fifth embodiment of an NT1 according to this invention.

FIG. 21 is a block diagram to show a fifth embodiment of the NT1 according to this invention.

The power feeder circuit 180 of this embodiment is provided with a short circuit protector 22, which protects the feeder 18 when the output is short-circuited. A power generator 23 is also provided, which generates the power. The short-circuit protector 22 can electrically disconnect the power output.

This embodiment is simplified in that the switch SW2 can be omitted. More particularly, the protector 22 is controlled by the control signal of power feeder disconnection from the circuit termination 150. The activation sequence is identical to the one in the first embodiment.

In the above embodiments, description has been made of the case where the operation of the power feeder 18 is verified by the voltage at the output a. However, this invention may be realized by structuring the circuit so that a load is inserted at the output a for testing power. In this case, it can detect a failure which lowers the power, even if the output voltage from the circuit 18 remains within the normal scope.

As is described in detail in the foregoing statement, the NT1 of this invention first verifies if the circuits which should operate at the time of activation by an incoming call from the terminal equipment and a power feeder which supplies power to the equipment are operating normally or not, and then executes a loopback test. This allows the NT1 according to this invention to test all the functions thereof including those of activation by an incoming call and of the power feeder simply by conducting a loopback test.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A network termination device for a telephone network which connects between a terminal equipment which produces a call origination signal and a telephone central office, comprising:
   first means for detecting a call origination signal and for transmitting information indicative thereof to said central office; and
   testing means, for testing a link of said telephone network, including:
   (a) loopback means, for receiving a transmitted signal and sending said transmitted signal back to a point from which it was produced, under command of a loopback signal;
   (b) pseudo-call origination means, for producing a call origination signal, responsive to a test operation, and coupling said call origination signal to said first means; and
   (c) loopback controlling means, for producing said loopback signal during a test mode only after a detection is made that said call origination signal has caused signals indicative of a call to be properly completed.

2. A device as in claim 1, further comprising
   power feeding means, connected to supply power at least to said first means and to said terminal equipment; and
   means for preventing errors in said supply of power from said power feeding means to said terminal equipment during said test mode.

3. A device as in claim 2, wherein said preventing means comprises a switch between said power feeding means, and said terminal equipment, which is opened during said test mode to prevent power supply to said terminal equipment during said test mode.

4. A device as in claim 2, wherein said preventing means comprises means for detecting a short circuit in said terminal equipment, and for terminating power flow to said terminal equipment when said short circuit is detected.

5. A device as in claim 2, wherein said call origination signal from said pseudo-call origination means is sent to said central office and responded to thereby, the response from said central office being said signals indicative of a call which are detected by said loopback controlling means.

6. A device as in claim 2, wherein said call origination signal from said pseudo-call origination means is sent directly to said loopback controlling means, which decides that it is proper as said signals indicative of a call.

7. A network termination device for a telephone network which connects between a terminal equipment which produces a call origination signal and a telephone central office, comprising:
   first means for detecting a call origination signal and for transmitting information indicative thereof to said central office;
   power feeding means, connected to supply power at least to said first means and to said terminal equipment; and
   testing means, for testing a link of said telephone network, including:
   (a) pseudo-call origination means, for producing a call origination signal, responsive to a test operation, and coupling said call origination signal to said first means;

(b) means for preventing errors in said supply of power from said power feeding means to said terminal equipment during said test operation; and (c) test controlling means, for commanding said test operation and detecting that said call origination signal has been properly completed to complete said test operation.

8. A network termination equipment for an integrated services digital network comprising:

a call origination detector which detects a call origination signal from a terminal equipment;

a call origination transmitter which transmits information detected by said call origination detector to a line termination equipment at a telephone central office;

a power feeder which supplies power to said terminal equipment;

loopback means which sends a transmitted signal from said line termination equipment at the telephone office back to said telephone office, based on a loopback signal; and means which generates a pseudo-call origination signal and transmits the same to said call origination detector and said call origination transmitter, wherein said loopback means includes a means which executes a loopback test only when said pseudo-call origination signal has been normally transmitted.

9. The network termination equipment as claimed in claim 8 which further includes a means which verifies normal operation of the power feeder.

10. A method of operating a network termination device for a telephone network which connects between a terminal device which produces a call origination signal and a telephone central office, comprising the steps of:

detecting a call origination signal;

transmitting information indicative thereof to said central office;

testing a link of said telephone network, by receiving a transmitted signal and sending said transmitted signal back to a point from which it was produced, under control of a loopback signal;

producing a call origination signal, responsive to a test operation, and coupling said call origination signal such that it is detected and transmitted; and producing said loopback signal during a test mode only after a detection is made that said call origination signal has been properly completed.

* * * * *